United States Patent [19]

Dray

[11] Patent Number: 4,896,969
[45] Date of Patent: Jan. 30, 1990

[54] METHOD AND APPARATUS FOR MELTING AND CONVEYING PLASTICATED MATERIAL

[76] Inventor: Robert F. Dray, Rte. 1, Box 273-M, Hamilton, Tex. 76531

[21] Appl. No.: 149,962

[22] Filed: Feb. 5, 1988

Related U.S. Application Data

[63] Continuation of Ser. No. 729,684, May 2, 1985, abandoned.

[51] Int. Cl.⁴ .............................. B01F 7/08; B29B 7/14
[52] U.S. Cl. .................................... 366/88; 366/89; 366/322; 366/323
[58] Field of Search .............. 366/79, 81, 82, 85, 366/87, 88, 89, 90, 322, 323, 324, 318, 319; 425/205, 207, 208, 209

[56] References Cited

U.S. PATENT DOCUMENTS

| | | | |
|---|---|---|---|
| Re. 28,901 | 7/1976 | Kim | 366/88 X |
| 2,754,542 | 7/1956 | Henning et al. | 366/85 X |
| 3,375,549 | 4/1968 | Geyer | 366/83 |
| 3,650,652 | 3/1972 | Dray et al. | 425/206 |
| 3,698,541 | 10/1972 | Barr | 366/88 X |
| 3,866,890 | 2/1975 | Tadmor et al. | 366/89 X |
| 3,998,438 | 12/1976 | Sokolow | 366/81 |
| 4,000,884 | 1/1977 | Chung | 366/88 |
| 4,136,967 | 1/1979 | Grigat et al. | 366/323 X |
| 4,171,196 | 10/1979 | Maillefer | 366/81 X |
| 4,201,481 | 5/1980 | Iddon et al. | 366/79 |
| 4,240,755 | 12/1980 | Frankland, Jr. | 366/88 |
| 4,277,182 | 7/1981 | Kruder | 366/89 |
| 4,341,474 | 7/1982 | Wheeler, Jr. et al. | 366/88 |
| 4,444,507 | 4/1984 | Dray | 366/319 X |

Primary Examiner—Harvey C. Hornsby
Assistant Examiner—Scott J. Haugland
Attorney, Agent, or Firm—Gamble, Verterano, Mojock, Piccione & Green

[57] ABSTRACT

This invention relates to a method and apparatus for melting and conveying plasticated materials by independently developing an initial melt film which is necessary for proper conveying of the material. The apparatus includes a barrel having a cylindrical bore therethrough, a shaft rotatable in said bore which has a substantially circular cross-section, the shaft and bore defining a feed section, a metering section and a transition section between the feed and metering sections. The shaft is provided with a helical first channel means integral with the shaft for conveying said plasticated material in a downstream direction through the feed section, the transition section, and the metering section when the shaft is rotated. A helical second channel means for producing an initial melt film is provided integral with the shaft for subjecting the material in the second channel means to high initial shear rates to rapidly form a melted film of plasticated material in proximity to a point of commencement of the feed section. The second channel means terminates at a point of beginning of the transition section whereupon the first channel means has a step through the transition section which step disappears before a point of beginning of the metering section.

15 Claims, 6 Drawing Sheets

METHOD AND APPARATUS FOR MELTING AND CONVEYING PLASTICATED MATERIAL

This application is a continuation of application Ser. No. 729,684, filed May 2, 1985, abandoned.

This invention relates to a method and apparatus for melting and conveying plasticated material.

More specifically, this invention relates to a method and apparatus for melting and conveying plasticated materials by independently developing an initial melt film which is necessary for a proper conveying of the material. The apparatus includes a barrel having a cylindrical bore therethrough, a shaft rotatable in said bore which has a substantially circular cross-section, the shaft and bore defining a feed section, a metering section and a transition section between the feed and metering sections. The shaft is provided with a helical first channel means integral with the shaft for conveying said plasticated material in a downstream direction through the feed section, the transition section, and the metering section when the shaft is rotated. A helical second channel means for producing an initial melt film is provided integral with the shaft for rapidly subjecting the material in the second channel means to high initial shear rates to form a melted film of plasticated material in proximity to a point of commencement of the feed section. The second channel means terminates at a point of beginning of the transition section whereupon the first channel means has a step through the transition section which step disappears before a point of beginning of the metering section.

DESCRIPTION OF THE PRIOR ART

The prior art of melting and conveying plasticated materials by an extruder screw rotating in a barrel is well documented. Traditionally, solid material is conveyed in a helical screw channel which channel gradually becomes shallower so as to expose the material to the interior surface of a bore in an extruder barrel, which is usually heated.

A well established melt film at the surface of the bore provides the necessary difference between the coefficient of friction between the bore and shaft or root of the screw so that effective conveying and pressure generation can be acheived. Until the melt film is properly established, efficient melting cannot be obtained in a conventional extruder having a smooth bore.

In a screw having a conventional feed section, a melt film is normally not formed until several turns of the flight from the beginning of the feed section, since the cold pellets of material must be heated at their surfaces to their respective melting point by either an external heat source on the barrel or by shearing of the pellets against the bore by the rotating flight. This process is at best unstable and can be disturbed by changes in the bulk density or the viscosity of the material or downstream pressure changes.

If the relationship and configuration of the section depths and lengths of the feed, transition and metering sections is not correct for the particular material being processed, the initial friction may be lost and the newly-formed melt film will not be stable. In that event, the conveying of solid material will stop, whereupon the solids will merely rotate with the screw and will not be conveyed downstream. Proper conveying will not occur again until the melt film is reestablished. This phenomenon is frequently referred to as "surging", and it has an obvious detrimental effect upon the quality and quantity of the material being processed. However, once a stable melt film is established, proper conveying and melting can efficiently take place.

To prevent this surging phenomenon, barrels which have grooves in the bore in the vicinity of the feed section were developed to prevent rotation of the solids and encourage conveying. However, these grooved barrels exhibit drawbacks such as increased torque requirements and reduced operating speeds.

In addition, several screw designs include an auxilliary channel located in the vicinity of the transition section. This auxilliary channel is separated from a main channel by an auxilliary flight or "barrier" which is frequently undercut from the main flight diameter and acts as a restrictive orifice. The pellets of solid material are exposed to high shear rates as they cross the barrier and should be substantially melted as they enter the auxilliary channel. Examples of this type of design may be seen in the patents to Geyer, U.S. Pat. No. 3,375,549; and Dray et al, U.S. Pat. No. 3,650,652. The melt film in these examples is continuously drained off into the auxilliary channel located in the transition section to permit the exposure of more of the unmelted material in the main channel to shearing stresses presented by the auxilliary flight and existing within the main channel. However, these designs depend upon a traditional solids conveying or feed section which must be carefully designed to establish a stable melt film.

Barrier type designs may exhibit a reduced capacity to convey in a transition section since the volume of the primary channel is continuously reduced. Difficulties are sometimes encountered because the auxilliary flight is in essence a restrictive orifice, and the melting resulting from the high shear rates across the barrier is highly sensitive to changes in the bulk density and viscosity of the material being processed. The end result may be unstable melting and surging. In a manner similar to conventional screws, if the main or primary channel in a feed section of a barrier design were to be too deep, the shear rates to which the material is subjected may be too low with resulting reduction in melting and efficiency. Conversly, if the primary channel were to be too shallow, the shear rate may reach unacceptably high values causing the melt to be overheated.

These drawbacks in the prior art also cause uncertainty in the extrusion of sheet material. Those skilled in the art will be familiar with attempts to control the thickness or gauge of the extruded material by increasing or decreasing the rotational speed of the screw. This is difficult because changes in the rotational speed of screw result in a change in the shear rate which in turn changes the viscosity of the melted material which produce pressure gradients within the screw channel. Thus, the thickness of the sheet becomes a function of several variables all of which change with the rotational speed of the screw and result in great difficulty in attempting to control sheet thickness by rotational speed alone.

Those skilled in the art will also recognize that these same variables must be taken into account in the configuration of the feed, transition and metering sections of a screw. Because bulk density and viscosity determine these configurations, and internal pressures developed within a screw channel cause these to vary unexpectedly, screw designs are quite specific to the type of material being processed. As an example, in a conventional design representative of the prior art, the appearance of a higher downstream pressure typically produces an increase in the shear rate until the viscosity of the material decreases to a point at which conveying can continue without any further decrease in the viscosity. This, however, increases the melt temperature even presupposing that the resulting fluctuations in these variables do not exceed the design capabilities of the screw which, of course, would all but prevent normal melting. These effects are only aggravated by changes in the physical and thermal properties of the material being processed.

The invention to be described more fully hereinafter remedies the shortcomings of the prior art and in addition, provides features and advantages not appearing therein.

It is, therefore, a primary object of the invention to provide a method and apparatus for melting and conveying plasticated material by encouraging the immediate formation of a melt film in close proximity to the inlet end of a screw, independently from feed section conveying and pressure build up.

Another object of the invention is to provide an independent formation of a stable melt film in the vicinity of the beginning of the feed section of the screw.

Yet another object of the invention is to improve melting in a single screw extruder by increasing the shear rate in the transition section of the screw without reducing the capacity of the transition section or producing excessively high temperatures in the material.

Still another object of the invention is to provide a method and apparatus for melting and conveying plasticated material which will not subject the material to unusually high temperatures within a channel which might cause degradation of the material.

Another object of the invention is to provide in a screw design the ability to increase the conveying capacity of a feed section by increasing its pitch or lead and its depth.

Yet another object of the invention is to provide a screw configuration which is less sensitive to the physical and thermal characteristics of the material being processed and is able to process a variety of materials.

Still another object of the invention is to decrease the overall melt temperature during extrusion at high and low die pressures with materials exhibiting both high and low viscosities.

Another object of the invention is to provide a capability for controlling the thickness of sheet material being processed in sheet extrusion by increasing or decreasing the initial temperature of the external heaters in the vicinity of the feed section, rather than by increasing or decreasing the rotational speed of the screw.

SUMMARY OF THE INVENTION

In the attaining of the foregoing objects, the present invention provides a method and apparatus as disclosed for melting and conveying plasticated materials, which includes a barrel having a cylindrical bore therethrough. A shaft which is rotatable within the bore is provided with a first helical flight which defines a feed section, a metering section, and a transition section. A second helical flight commences at a point of beginning of the feed section and extends to the beginning of the transition section. In the preferred embodiment the first and second flights define a pair of channels in the feed section, which are disclosed as parallel in the preferred embodiment. One of the channels, identified herein as a second channel, is shallower than the other channel which is identified as a first channel, in order to form a melt film in the second channel at a location very near to the inlet end of the apparatus. The early formation of the melt film "wets" the bore of the barrel and provides for the efficient conveying of the material in the deeper channel.

In the preferred embodiment, the second flight and the second channel terminate at the end of the feed section, whereafter the channel is defined by the first flight and the shaft of the screw. The channel in the transition section is provided with two un-equal adjacent diameters within the channel which define a helical step, the smaller diameter being oriented downstream from the larger diameter. A helical land formed by the larger diameter provides high shear rates and a large amount of melted material downstream toward the end of the transition section. The smaller diameter remains substantially equal to its diameter in the feed section, and continues well into the transition section. Toward the end of the transition section the smaller diameter, gradually increases to the diameter of the shaft at the beginning of the metering section. The diameter of the land gradually decreases through the transition section so as to likewise become equal to the shaft diameter at the point of beginning of the metering section. The step disappears at such point due to the equivalence of the shaft and land diameters. Throughout the transition section, melted material in the vicinity of the land and solid material in the vicinity of the shaft diameter are commingled which reduces the overall melt temperature as the heat of the melted material is transferred by conduction to the remaining unmelted material which allows higher screw rotational speeds and greater outputs.

DESCRIPTION OF THE DRAWINGS

Other objects and advantages of the present invention will become apparent from the ensuing description and the illustrative embodiment thereof, in the course of which, reference is made to the accompanying drawings in which.

DESCRIPTION OF THE PREFERRED EMBODIMENT

Figure 1:
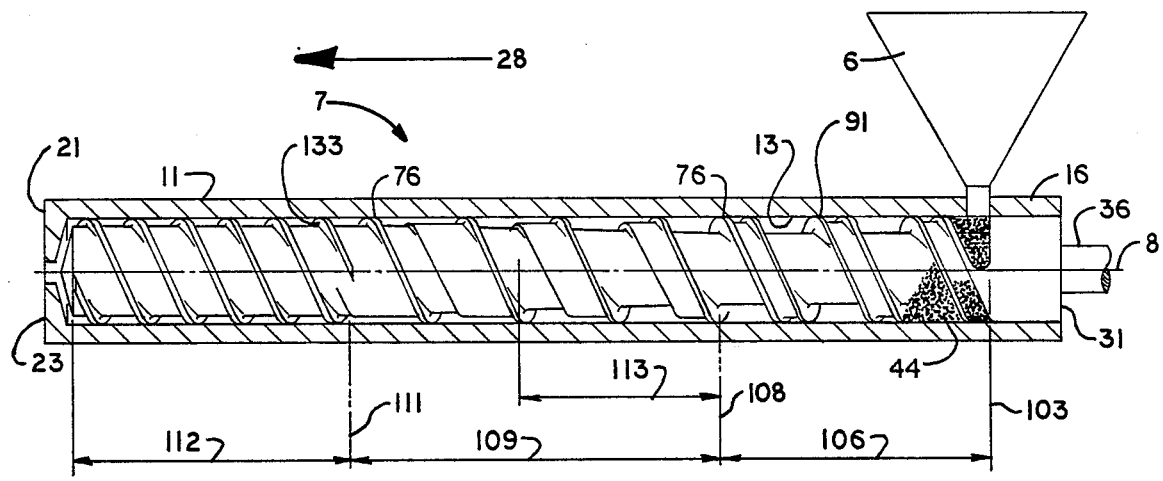
FIG. 1 is a view of an extruder embodying the invention.

Reference is now made to FIG. 1, which depicts a portion of a plasticizing extruder indicated generally by reference numeral 7. For purposes of illustration and clarity, the drive mechanism which is normally connected to driveshaft 36 and likewise, the barrel heaters, which normally are attached to barrel 11 throughout feed section 106, have been omitted. Barrel 11 is generally cylindrical and is provided with cylindrical bore 13 therethrough, which has an axis for rotation 8. Screw 31 includes shaft 39 and is rotatable about axis 8 within bore 13, shaft 39 has a diameter 41 which varies along axis 8 in a downstream direction indicated generally by reference numeral 2B. Extruder 7 also has inlet end 16 in proximity to hopper 6 and outlet end 21 in proximity to outlet 23 where the melted material is ultimately discharged. When driveshaft 36 and screw 31 are rotated within bore 13, pellets of plasticated material, indicated generally by reference numeral 44, which are contained in hopper 6, are conveyed in a downstream direction as indicated by reference numeral 28, due to first helical flight 76 and second helical flight 91, both of which commence at beginning point 103 of feed section 106 and have flight diameter 92. In practice, flight diameter 92 is slightly less than the diameter of bore 13. If desired for a particular application, the diameter of second flight 91 may be made smaller or "undercut" from the diameter of first flight 86. In the preferred embodiment of the invention, first flight 76 has a pitch (sometimes referred to as a lead) which is greater than the flight diameter 92. For example, if the nominal flight diameter 92 is 4½ inches, an appropriate initial pitch of first flight 76 might be 5½ inches. This permits a larger channel width which in turn permits the conveying of a greater amount of material.

Figure 2A:
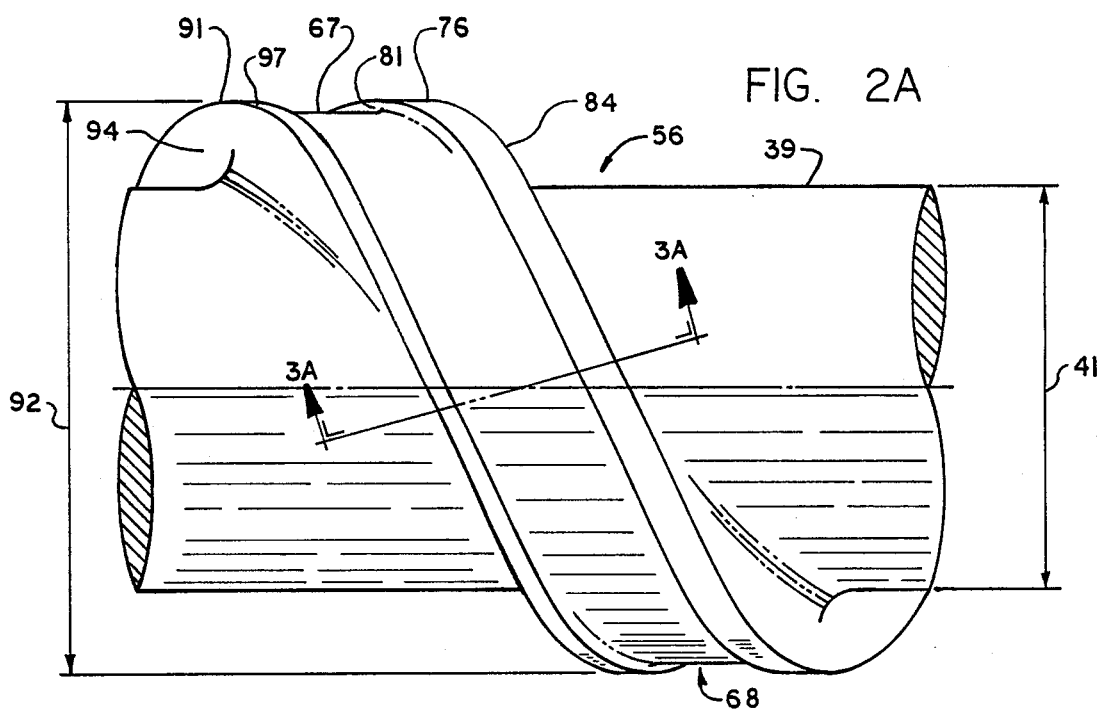
FIG. 2A is a detail view of a portion of the apparatus involved in a feed section of the preferred embodiment of the invention.
Figure 3A:
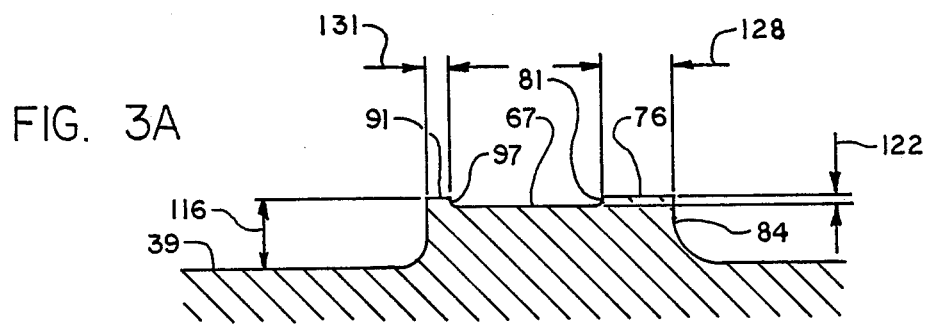
FIG. 3A is a section taken along line 3A-3A of FIG. 2A.

Referring now to FIG. 1, FIG. 2A and FIG. 3A, first flight 76 has pushing side 81, and trailing side 84, pushing side 81 being oriented downstream from trailing side 84. Second flight 91 is downstream from first flight 76 and has pushing side 94 and trailing side 97, pushing side 94 being downstream from trailing side 97. It is important to note that first flight 76 and second flight 91 both commence at beginning point 103 of feed section 106, as do first channel 56 and second channel 68. It is readily evident that the hopper 6 which carries plasticated material is characterized by the presence of an open region, not referenced, which open region is communicatingly coupled by means of a single opening (not referenced) through the barrel 11 into the bore 13 to thereby deliver all of a plasticated material from the open region of hopper 6 through the single barrel opening into first and second channels 56 and 58 described more fully hereinafter. First and second channels 56 and 58 are sequentially filled from hopper 6 as they pass beneath the single barrel opening when screw 31 rotates. First flight 76 and second flight 91 are shown on FIG. 1 as being parallel, however, as will be discussed hereinafter, first flight 76 and second flight 91 need not be, depending upon the type of material being processed and if additional compaction is required for very low density material, for example. Screw 31 may be seen in FIG. 1 to be divided into feed section 106 for solids conveying, which section is located in proximity to inlet end 16, metering section 112 for pumping the melted material, which section is located downstream from feed section 106 in proximity to outlet end 21 and outlet 23, and transition section 109, which is located between feed section 106 and metering section 112.

Trailing side 84 of first flight 76, shaft 39 and pushing side 94 of second flight 91 define first channel 56, which is approximately rectangular in cross section. Upon rotation of screw 31, plasticated material 44 is conveyed in downstream direction 28 sequentially through feed section 106, transition section 109 and metering section 112 and outlet 23. Although the preferred embodiment discloses what is commonly referred to as a single stage screw having a feed section, a transition section and a metering section, it should be apparent to those skilled in the art that screw 31 may have more than one stage and may include multiple feed metering sections and further be provided with a venting section, mixing devices or multiple flights depending on the characteristics of the material to be processed.

Still referring to FIGS. 1, 2A, 2B and 3A, land 67 is provided between first flight 76 and second flight 91, such that a second channel 68 is defined by pushing side 81 of first flight 76, trailing side 97 of second flight 91 and land 67. As may be seen in FIG. 2A and 3A, first channel 56 has a first channel depth 116 as measured radially between flight diameter 92 and and shaft diameter 41, which first channel depth 116 is greater than second channel depth 122, which is measured radially between flight diameter 92 and land diameter 71. First flight 76 and second flight 91 are continuous throughout feed section 106. Second flight 91 and second channel 68 terminate at a point where feed section 106 ends and transition section 109 commences. In the preferred embodiment, first channel depth 116 remains constant while second channel depth 122 becomes shallower in downstream direction 28 throughout feed section 106, as will be further illustrated in an example of an actual configuration for screw 31.

Figure 2B:
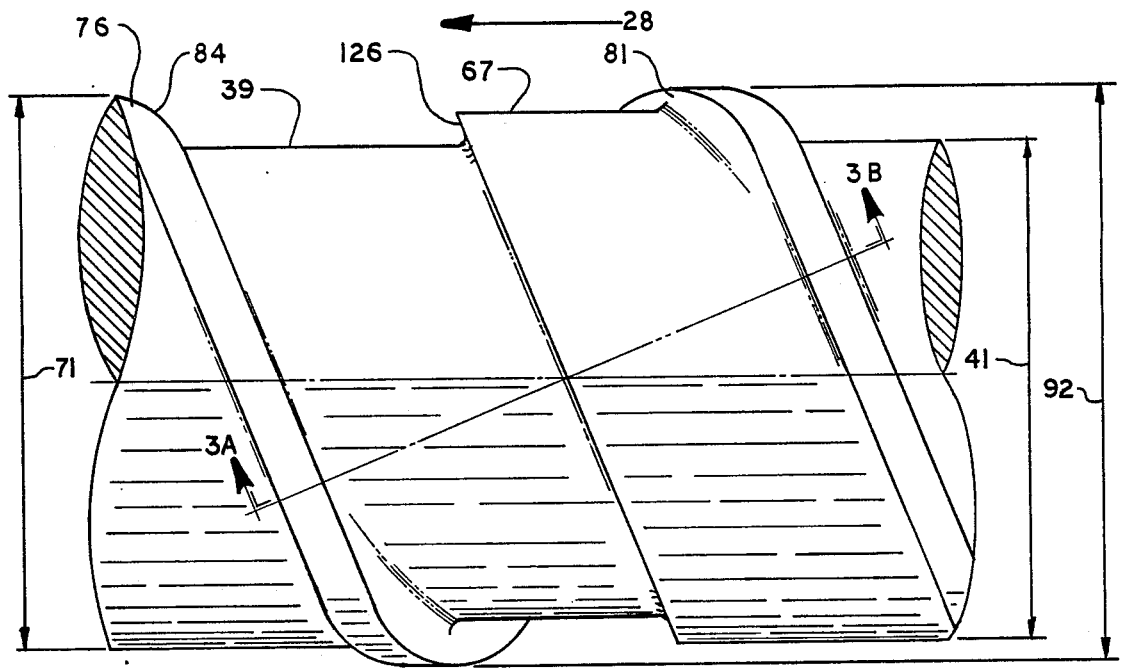
FIG. 2B is a detail view of a portion of the apparatus involved in a transition section of the preferred embodiment.
Figure 3B:
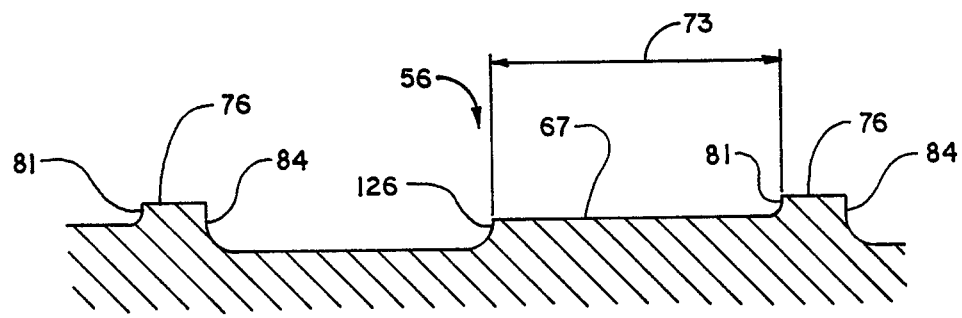
FIG. 3B is a section taken along line 3B-3B of FIG. 2B.

Referring now to FIGS. 1, 2B and 3B, second flight 91 and second channel 68 have terminated at a point of beginning 108 of transition section 109. First flight 76 continues throughout transition section 109 and first channel 56 is therein defined by shaft 39, pushing side 81 and trailing side 84 of first flight 76. However, a difference between shaft diameter 41 and land diameter 71 continues in transition section 109. Shaft diameter 41 is downstream from and adjacent to land diameter 71, and form a step 126 between shaft diameter 41 and land diameter 71, throughout transition section 109. In the preferred embodiment, shaft diameter 41 may be seen first remaining at its former diameter as in feed section 106 for a predetermined distance 113 along transition section 109 in a downstream direction 28 and then increasing gradually as it aproaches point of termination 111 of transition section 109 while land diameter 71 gradually decreases until at a point of termination 111 of transition section 109 which is also the commencement of metering section 112, shaft diameter 41 and land diameter 71 become substantially equal, whereupon step 126 disappears. Predetermined distance 113 depends upon the particular melting characteristics of material 44, but as will be shown in a typical application, it may extend approximately 78% of the length of transition section 109.

It is apparant that step 126 is also helical and has a pitch which may or may not be equal to the pitch of first flight 76. The pitch of first flight 76 in transition section 109, in the preferred embodiment, is reduced so as to be approximately equal to the nominal flight diameter 92 of screw 31. Thus, for a screw having a given flight diameter 92, first flight 76 could have a pitch approximately equal to flight diameter 92 in a transition section 109, a reduction from the pitch in feed section 106 as discussed above. The pitch of the first flight 76 may be reduced because the increased volume is no longer needed. Step 126 may be provided with a pitch which is identical to the pitch of first flight 76, in which case step 126 and first flight 76 will be parallel and land width 73 will remain constant throughout transition section 109. Alternatively, step 126 may have a pitch greater than the pitch of firs flight 76, in which case land width 73 will increase throughout transition section 109 and step 126 will approach trailing side 84 of first flight 76 or conversely step 126 may have a pitch which becomes less than the pitch of first flight 76 in transition section 109, in which case land width 73 will decrease throughout transition section 109. The exact configuration of land width 73 will depend on the shear rate desired in the vicinity of land 67 and also on the melting characteristics of plasticated material 44. FIG. 1 discloses step 126 having a pitch larger than the pitch of first flight 76 so that land width 73 increases throughout transition section 109, while simultaneously step 126 has disappeared in a smooth fairing at the point of termination 111 of transition section 109, due to the increasing of shaft diameter 41 and the decreasing of land diameter 71. First channel 56 has a depth 116 which is uniform at point of termination 111 of transition section 109.

Metering section 112 is disclosed as having a uniform shaft diameter 41. First flight 76 continues into metering section 112 and is shown together with a third flight designated by reference numeral 133. Third flight 133 begins approximately at a point where step 126 terminates and is parallel to first flight 76. Those skilled in the art will recognize that third flight 133 is not critical to the operation of the invention but provides two parallel sets at flights in metering section 112 for improved mixing and pumping of types of materials.

By way of an illustrative example of a screw embodying the above characteristics, the following configuration was successfully used on a 24:1 L/D single stage screw. For purposes of clarity, only those characteristics directly illustrating the invention disclosed herein will be described.

Length of continuation of feed section shaft diameter 41 into transition section 109 in a downstream direction 28 is approximately 78% of the length of transition section 109 as measured from the point of beginning 108 of transition section 109;

first channel depth 116 in feed section 106 is approximately 13% of flight diameter 92;

second channel depth 122 in feed section 106 decreases from 11.1% to 1.1% of the flight diameter 92 in downstream direction 28;

shaft diameter 41 increases through transition section 109 in a downstream direction 28 by approximately 21%;

land diameter 71 decreases through transition section 109 in downstream direction 28 by approximately 9.1%;

pitch in feed section 106 (first flight 76 and second flight 91) is 1.222 times flight diameter 92;

pitch of first flight 76 in transition section 109 is equal to the first diameter 92;

pitch of step 126 in transition section 109 is 1.034 times flight diameter 92; and pitch of first flight 76 and third flight 133 in metering section 112 is equal to flight diameter 92.

Those skilled in the art will notice that the pitch of first flight 76 and second flight 91 in feed section 106 is larger than would normally be expected. In addition, first channel depth 116 is greater than that which would normally be encountered.

Figure 5A:
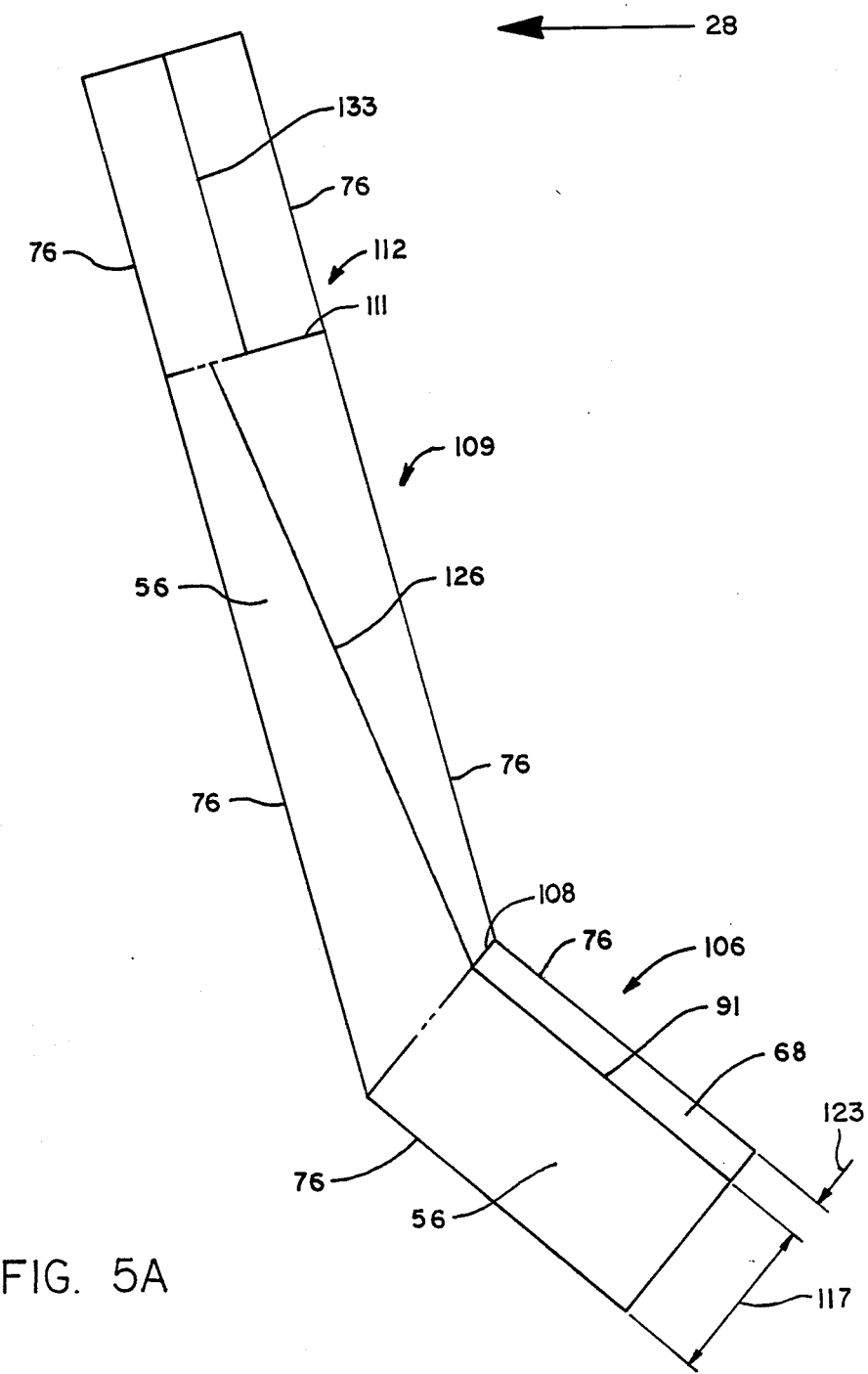
FIG. 5A is a view of an "unwrapped" or developed channel of a screw having a configuration similar to that disclosed herein showing a second channel becoming narrower.
Figure 5B:
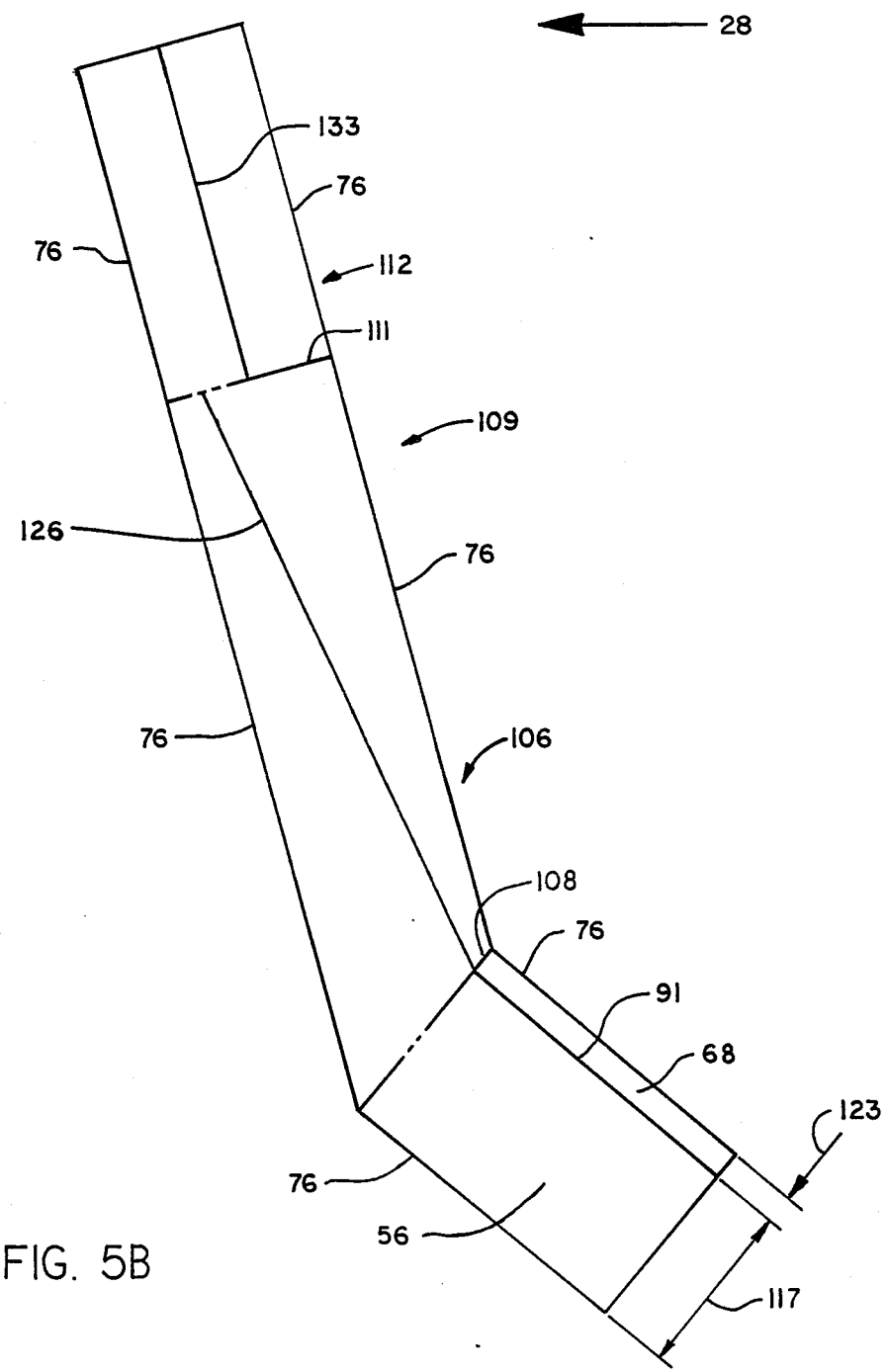
FIG. 5B is another view of an unwrapped or developed channel showing a first channel becoming narrower.

It is sometimes desirable to vary the width 117 of first channel 56 or the width 123 second channel 68, again, depending on the type of material being processed, as may be seen by reference to FIGS. 5A and 5B, which are developed or "unwrapped" channels of a screw emboding the features discussed.

Specifically, FIG. 5A shows feed section 106, in schematic form for purposes of clarity, having first channel 56 and second channel 68, first channel 56 may be seen as having a constant width 117 whereas second channel 68 has a width 123 which decreases in downstream direction 28. Conversely, as may be seen by reference to FIG. 5B, width 117 of first channel 56 narrows while width 123 of second channel remains constant in downstream direction 28. As an example, width 123 of second channel 68 might be narrowed by increasing width 128 of first flight 76 such that pushing side 81 of first flight 76 approaches trailing side 97 of second flight 91, thus narrowing second channel 69. Alternatively, width 117 of first channel 56 might be narrowed by increasing width 128 of first flight 76 such that trailing side 84 of first flight 76 approaches pushing side 94 of second flight 91. Conversely, width 131 of second flight 91 might be increased to accomplish a similar effect.

This type of a configuration is quite useful as an aid to the compaction of very low density or "fluff" materials such as regrind. As first channel width 117 or second channel width 123 is narrowed, material 44 in the respective channel is compacted without any appreciable increase in the shear rate, as would normally occur if compaction were attempted by way of decreasing first channel depth 116 in feed section 106. Due to the larger than normal initial pitch of first flight 76 and second flight 91, there is an ample margin for the narrowing of either first channel width 117 or second channel width 123 and yet still maintain an adequate volume in either. It should be appreciated that in addition to varying of either of the channel widths, the relationship of the depths of first channel depth 116 and second channel depth 122, discussed above, may be varied so that first channel 56 and second channel 68 may be specifically configured to enhance the melting and conveying of a particular material.

OPERATION

Operation of the device is best understood by initially referring to FIG. 1. As screw 31 is rotated by way of driveshaft 36 inside bore 13 of barrel 11, material 44, which is contained in solid form in hopper 6, enters first channel 56 and second channel 68 at beginning point 103 of feed section 106. As discussed above, the prior art provides an auxilliary channel used to drain off the melt film formed in a main channel in a transition section. In the present invention, however, second channel 68 itself forms the initial melt film in proximity to beginning point 103 of feed section 106.

Figure 4B:
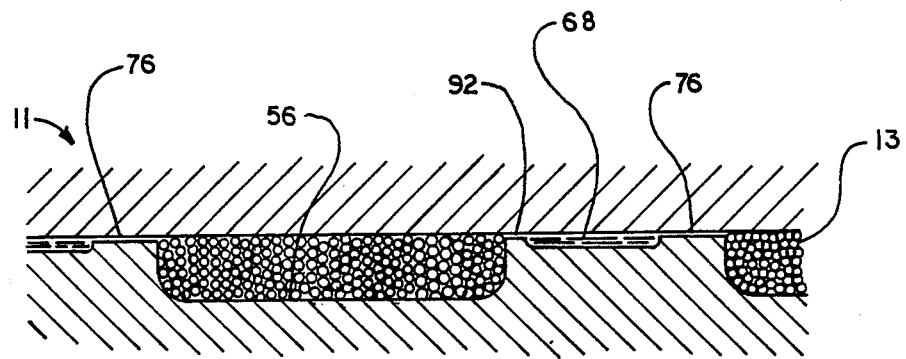
FIG. 4B is a section similar to FIG. 3A showing the formation of a melt film in a second channel of the preferred embodiment.
Figure 4C:
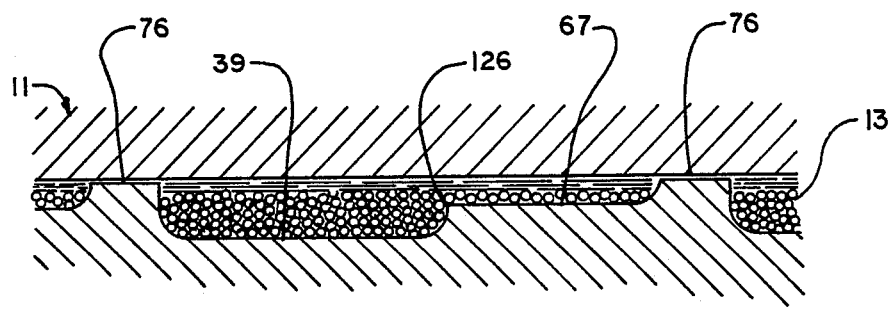
FIG. 4C is a section similar to FIG. 3B showing melting taking place in a transition section of the preferred embodiment.
Figure 4A:
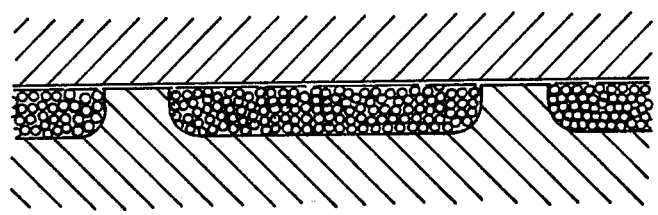
FIG. 4A is a section taken through a channel of an extruder screw representing the prior art not otherwise illustrated.

Since, as may be seen in FIG. 3A, second channel 68 has a very shallow depth 122, it immediately subjects material 44 to high shear rates very early in feed section 106, with the result that a melt film is established in close proximity to inlet end 16 of screw 31. Meanwhile, the material 44 in first channel 56 is subjected to lower shear rates since first channel depth 116 is greater than second channel depth 122 and less melting of material 44 takes place. A depiction of this may be seen in FIG. 4B, which shows the material 44 in second channel 68 nearly melted while the material in first channel 56 is conveyed downstream in unmelted form. By way of contrast, FIG. 4A shows a section of channel at an equivalent location along a screw similar to screw 31 which contains mostly solid material with some melt film beginning to form, which would normally be 4 to 5 turns of the flight downstream from the inlet end 16. Returning to FIG. 4B, as screw 31 rotates, the melt film immediately forming in second channel 68 can "wet" bore 13 and is much more stable than the melt film formed in a conventional feed section. The difference in the coefficients of friction between bore 13 and shaft 39 is well established and the conveying of material 44 in first channel 56 is much more efficient due to the earlier forming of the melted film of material 44. This early formation of a melt film in second channel 68 may be seen to be independent of solids conveying in first channel 56.

As the material 44 continues to move in a downstream direction, second flight 31 and second channel 68 terminate at the end of feed section 106 and the beginning of transition section 109. By this point, the melt film has been well established and is quite stable, thus permitting efficient solids conveying. Referring now to FIGS. 2B and 4C second channel 68 has "emptied" into first channel 56 which is now defined by first flight 76, shaft 39 and land 67 and first channel 56 has in addition step 126 between shaft diameter 41 and land diameter 71. Land diameter 71 provides a narrower and shallower area for the maximum production of melt film. Meanwhile, shaft diameter 41 remains substantially the same as in feed section 106 or possibly shaft diameter 41 may be initially reduced in transition section 109. This has the effect of extending feed section 106 well into transition section 109 for distance 113 so as to provide a large amount of cooler unmelted material 44 toward the point of termination 111 of transition section 109, which can commingle with the melted material in the vicinity of land 67. This reduces the overall melt temperature of the material as the melted material in the vicinity of land 67 transfers its heat to the unmelted material in the vicinity of shaft 39 by conduction in leaving transition section 109 and progressing through metering section 112. Step 126 is able to permit the gradual controlled intermixing of material at two different temperatures within first channel 56, since as step 126 disappears, the unmelted and melted material is commingled throughout transition section 109 in first channel 56.

Metering section 112, which may be provided with third flight 133 in conjunction with first flight 76 pumps the melted material through outlet 23 and a die which, although not illustrated, may be provided at outlet end 21.

Thus, it may be seen from the foregoing description that there is provided a method and apparatus for melting and conveying plasticated material by encouraging the independent formation of a melt film in the vicinity of the beginning of the feed section. The melt film formed in a second channel is stable and is able to "wet" the bore of the extruder barrel which greatly improves the conveying of solid material.

In addition, a transition section is provided which increases melting rates, thus enhancing the melting taking place in the main channel. Due to the commingling of the melted and solid material well into the transiton section, melt temperatures remain within acceptable limits for the prevention of the degradation of the material. The capacity of the transition section is not reduced due to the increase of pitch of the feed section which is able to convey solid material at a greater rate without the danger of "surging", since melting is already well developed in an auxilliary channel in the feed section.

Because the initial melt film is formed independently in the second channel at the beginning of the feed section, the differential between the frictional coefficients of the bore and the shaft or "root" of the screw are well established, and the feed section is much less sensitive to a shortened residence time of the material in the feed section if the pitch of the flight were to be increased. As a result, the pitch of the flight may be increased without loss of mechanical advantage; and further, the first channel depth in a feed section can be increased without detriment to melting occurring in the first channel.

In addition, the characteristics and design of the feed section of the screw is less dependent upon the physical and thermal characteristics of the material. The melt film can be established in a second channel for a wide variety of materials since it is independent of what is occurring in the first or main channel. If there should appear an increase in downstream pressure, the melt film in the second channel is not as readily disturbed as in the prior art. In fact it has been observed that such pressure increases serve to assist the entire melting process by further compacting the yet unmelted material in the vicinity of the step in the transition section, thus permitting improved heat transfer from the melted material as the two commingle toward the end of the transition section.

It should also be noted that because the melt film is formed in the second channel as an independent event, it can likewise be controlled by independent means. In the present invention as in the prior art, barrel heaters are used in the vicinity of the feed section to assist the formation of a melt film. It has been observed that by increasing the initial temperatures in the feed zone by increasing the heat imput from the heaters, melt formation in the second channel is increased. This, in turn, provides an improved "wetting" of the bore together with more melted material to commingle with the yet unmelted material in the transition section, resulting in an increase in output, sometimes measured in the art as the variable "pounds per hour per revolutions per minute" or "lbs./hr./rpm". A decrease in the initial heater temperatures would have an opposite effect by reducing the amount of melt formed in the second channel, thereby reducing lbs./hr./rpm. This adjustment would occur independent of screw speed and permits a much greater control of output than merely a varying of the screw speed, since density and viscosity effects do not have so great an impact on melting. The advantage to the control of sheet thickness should be apparant because, in the invention disclosed herein, heater temperature may be used to vary output which permits a greater degree of control without producing adverse changes in bulk density, pressure or viscosity or without allowing slight fluctuations of these variables, if they do occur, to adversely effect the quality of the extruders output.

Although only certain embodiments of the present invention have been illustrated and described, it will be apparent to those skilled in the art that various changes and modification may be made to these embodiments without departing from the spirit and scope of the invention.

I claim:

1. Apparatus for independently developing an initial melt film to convey plasticated material comprising:
   (a) a barrel having a cylindrical bore therethrough;
   (b) a shaft rotatable in said bore and having a substantially circular cross-section and an axis for rotation concentric with said bore, said shaft further having a helical first and a second flight formed thereabout, said first flight, said second flight and said shaft defining a helical first and a second channel means, said first and second flights having respective diameters which are less than the diameter of said bore, said barrel, said shaft and said first and second channel means defining a feed section, a metering section and a transition section therebetween;
   (c) a plasticated material hopper communicatingly coupled by means of a single opening through said barrel into said bore to thereby deliver sequentially a plasticated material at a beginning of said feed section from said hopper through said single barrel opening into said first and second channel means;
   (d) said first channel means having a constant depth in said feed section for conveying plasticated material through said feed section, said transition section and said metering section in a downstream direction upon rotation of said shaft; and
   (e) said second channel means being shallower than said first channel means to thereby immediately subject plasticated material in said second channel means to high shear rates which thereby independently develops an initial melt film of said plasticated material in said second channel means in the immediate vicinity of a point of commencement of said feed section, said second channel means terminating at an end of said feed section, said initial melt film in said second channel means wetting said bore in the immediate vicinity of said point of commencement of said feed section thereby establishing a stable melt film through said feed section that permits efficient conveying of said plasticated material from said single barrel opening of said hopper through said feed section and into said transition section.

2. The apparatus of claim 1 wherein said first and second channel means are defined by a first helical flight, a second helical flight and said shaft, said first channel means having a width and a radial depth, said flights having a diameter less than the diameter of said bore.

3. The apparatus of claim 2 wherein said second channel means has a width and is located upstream from said first channel means said second channel means further having a radial depth which is less than said radial depth of said first channel means said radial depth of said second channel means decreasing in a downstream direction to a predetermined depth, said second flight and said second channel means terminating at a point of beginning of said transition section.

4. The apparatus of claim 3 wherein said width of said first channel means decreases in a downstream direction.

5. The apparatus of claim 3 wherein said width of said second channel means decreases in a downstream direction.

6. The apparatus of claim 3 wherein said first channel means and said second channel means are parallel, said width of said second channel means being less than said width of said first channel.

7. The apparatus of claim 6 wherein said constant radial depth of said first channel means in said feed section extends a predetermined distance in said transition section.

8. The apparatus of claim 7 wherein said second flight has a flight diameter which is equal to a flight diameter of said first flight.

9. The apparatus of claim 7 wherein said second flight has a flight diameter which is less than a flight diameter of said first flight.

10. Apparatus for independently developing an initial film to convey plasticated material comprising:
    (a) a barrel having a cylindrical bore therethrough;
    (b) a shaft rotatable in said bore and having a substantially circular cross-section and an axis for rotation concentric with said bore;
    (c) a continous helical first flight integral with said shaft and having a diameter less than the diameter of said bore, said first flight and said shaft defining a feed section, a metering section and a transition section therebetween, said first flight having a pitch within said feed section which pitch is larger than a diameter of said first flight said first flight further having a pushing side and a trailing side;
    (d) a continuous helical second flight integral with said shaft and parallel to said first flight having a diameter equal to said first flight and having a pushing side and a trailing side, said second flight extending from a point of beginning of said feed section to a point of commencement of said transition section, said trailing side of said first flight, said pushing side of said second flight and said shaft defining a helical first channel having a first channel depth and a first channel width for conveying plasticated material in a downstream direction as said shaft is rotated, said pushing side of said first flight, said trailing side of said second flight and said shaft defining a helical second channel having a second channel depth substantially less than said first channel depth and a second channel width, said second channel extending through said feed section to said point of commencement of said transition section, said first channel depth being constant within said first channel throughout said feed section, said second channel depth decreasing in a downstream direction to thereby subject plasticated material in said second channel to a high shear at said point of commencement of said feed section which thereby independently develops said initial melt film in the immediate vicinity of said point of commencement of said feed section thereby establishing a stable melt film throughout said feed section that provides for efficient conveying of said plasticated material through said feed section and into said transition section, said pitch of said first flight being reduced at said point of commencement of said transition section to approximately the diameter of said bore, said first channel in said transition and metering sections being defined by said first flight and said shaft, said shaft within said transition section having a larger diameter and a smaller diameter adjacent thereto within said first channel, said smaller diameter being downstream from said larger diameter and defining a helical step having a pitch which step extends through said transition section to a point of commencement of said metering section; and (e) a plasticated material hopper communicatingly coupled by means of a single opening through said barrel into said bore to thereby deliver sequentially said plasticated material at said beginning of said feed section from said hopper through said single barrel opening into said first and second channels.

11. The apparatus of claim 10 wherein said larger diameter of said shaft decreases, and said smaller diameter increases such that said diameters become substantially equal at said point of commencement of said metering section.

12. The apparatus of claim 11 wherein said pitch of said step is larger than said pitch of said first flight within said transaction section.

13. The apparatus of claim 12 wherein said first channel width is greater than said second channel width.

14. The apparatus of claim 13 wherein said smaller diameter remains substantially constant for a predetermined distance in said downstream direction in said transition section and thereafter increases so as to become equal to said larger diameter.

15. A method for independently developing an initial melt film to convey plasticated material in a plasticating apparatus, said plasticating apparatus having:

a barrel having a cylindrical bore therethrough;

a shaft rotatable within said bore and having a substantially circular cross-section and an axis of rotation concentric with said bore, said barrel and shaft further defining a feed section, a metering section and a transition section therebetween;

a plasticated material hopper communicatingly coupled by means of a single opening through said barrel into said bore to thereby allow the sequential delivery of a plasticated material at a beginning of said feed section from said hopper through said single barrel opening into one helical channel means and another helical channel means, said helical channel means and said other helical channel means being integral with said shaft, said method including the steps of:

(a) sequentially delivering plasticated material from said hopper to said one helical channel means and then to said other helical channel means, (b) forming an independently developed initial melt film in said feed section in the immediate vicinity of a point of commencement of said feed section in said one helical channel means, said one helical channel means defined by a pushing side of a helical first flight integral with said shaft, a trailing side of a helical second flight integral with said shaft and said shaft, said shaft having a predetermined diameter within said one helical channel means predetermined in accordance with the melting characteristics of said plasticated material such that said material is subject to high shear rates and shearing stresses within said one helical channel which thereby independently develops said initial melt film throughout said feed section in said one helical channel means to thereby provide for the efficient conveying of said plasticated material through said feed section into said transition section;

(c) conveying in a downstream direction said plasticated material sequentially introduced into said other channel defined by a trailing side of said first flight, a pushing side of said second flight and said shaft, said shaft having a predetermined diameter within said other channel such that said material is subjected to shear rates and shearing stresses which are less than said shear rates and stresses in said one channel means, said channel means defining said feed section;

(d) commingling said melt film in said one helical channel means and said plasticated material in said other channel in said transition section commencing at a point of termination of said feed section, said one channel and said second flight terminating at said point of termination, said other channel thereafter being defined by said first flight and said shaft and including a helical step formed by adjacent and unequal diameters of said shaft between consecutive turns of said first flight, a smaller diameter being downstream of a larger diameter, said smaller diameter increasing in said downstream direction and said larger diameter decreasing in said downstream direction until said larger and smaller diameters become equal at a location along a longitudinal axis in proximity to a point of commencement of said metering section defined by said first flight and said shaft.

* * * * *